United States Patent [19]

Ottesen et al.

[11] Patent Number: 5,327,298
[45] Date of Patent: Jul. 5, 1994

[54] NOISE MINIMIZATION FOR MAGNETIC DATA STORAGE DRIVES USING OVERSAMPLING TECHNIQUES

[75] Inventors: Hal H. Ottesen; Gordon J. Smith, both of Rochester, Minn.

[73] Assignee: International Business Machines Corporation, Armonk, N.Y.

[21] Appl. No.: 943,270

[22] Filed: Sep. 10, 1992

[51] Int. Cl.$^5$ .............................................. G11B 5/09
[52] U.S. Cl. ........................................ 360/48; 360/46
[58] Field of Search ................ 360/46, 40, 2, 1, 67, 360/51, 32, 36.1, 26, 39, 48; 324/240, 242, 77 B; 364/572.10, 572.9, 572.1, 572.11; 358/342, 343, 340, 328

[56] References Cited

U.S. PATENT DOCUMENTS

| 4,689,759 | 8/1987 | Anouar et al. | 364/572 |
| 4,707,841 | 11/1987 | Yen et al. | 375/106 |
| 4,750,055 | 6/1988 | Van Lier | 358/342 X |
| 4,763,207 | 8/1988 | Podolak et al. | 360/32 |
| 4,831,464 | 5/1989 | Chijiwa | 360/32 |
| 4,837,642 | 6/1989 | Smidth | 360/46 |
| 4,853,797 | 8/1989 | Yamada et al. | 360/32 |
| 4,885,646 | 12/1989 | Kanota et al. | 360/46 |
| 4,906,928 | 3/1990 | Gard | 324/240 |
| 4,949,177 | 8/1990 | Bannister et al. | 358/138 X |
| 4,950,999 | 8/1990 | Agnello et al. | 324/77 B X |
| 5,003,559 | 3/1991 | Kanai et al. | 375/109 |
| 5,166,955 | 11/1992 | Ohta | 375/11 X |
| 5,220,466 | 6/1993 | Coker et al. | 360/46 |

FOREIGN PATENT DOCUMENTS

| 5377850 | 1/1980 | Japan | G11B 5/09 |
| 63-296511 | 2/1988 | Japan | G11B 5/09 |
| 2-21712 | 2/1990 | Japan | G11B 5/09 |

Primary Examiner—Donald Hajec
Assistant Examiner—Thien Minh Le
Attorney, Agent, or Firm—Baker, Maxham, Jester & Meador

[57] ABSTRACT

A method and apparatus for minimizing the effects of non-stationary high-energy noise sources in magnetic data storage channel through the use of an oversampling and post-sampling filtering anti-aliasing procedure. The initial analog data is sampled at a rate sufficiently above the Nyquist rate to avoid aliasing. The high-frequency sampling stream is then digitally filtered to produce a lower-rate digital data stream having a reduced Nyquist rate introduced by the post-sampling digital filter. Because the anti-aliasing post-sampling filter is digital, no phase distortion is introduced in the readback data signal. Because the post-sampling digital filter lowers the Nyquist rate, late digital processing and decoding is accomplished without aliasing at a data rate below the initial Nyquist rate. High-energy noise pulses are preserved without smearing and can be simply removed by the usual error-correction method.

7 Claims, 6 Drawing Sheets

NOISE MINIMIZATION FOR MAGNETIC DATA STORAGE DRIVES USING OVERSAMPLING TECHNIQUES

BACKGROUND OF THE INVENTION

1. Field of the Invention

The invention relates generally to magnetic data storage drives, and more specifically to a method and an apparatus for minimizing the effects of noise sources through the utilization of oversampling techniques.

2. Description of the Prior Art

State of the art data storage drives often utilize magnetic data storage media such as tapes and/or disks. These drives employ magnetic read/write heads to perform data access operations on the data storage medium. For example, in the context of disk media, magnetoresistive (MR), thin film, or ferrite (MIG) heads are often employed. Although these read/write heads have provided generally satisfactory results for some system applications, the use of these heads may present significant drawbacks. Read/write heads, especially the magnetoresistive (MR) type, are very susceptible to stray electromagnetic fields emanating from sources other than the disk media. Stray electromagnetic field pickup is undesirable because it adds noise to the signal read by the MR head. If the stray fields cause a significant degradation in signal to noise ratio, data may be lost and/or altered.

One approach for reducing the noise pickup of the read/write head, applicable in the context of MR heads, is to ensure that the shields on either side of the MR head stripe are isolated from the slider body. The connection of one of these shields to the slider body destroys the noise immunity afforded by common mode rejection, thereby rendering the head susceptible to a multitude of noise sources from within the disk drive. The head will also be vulnerable to fields originating outside of the disk drive.

Two major factors cause the shield to short out to the slider body. First, the short may occur during the manufacturing process. Second, even if the head leaves the factory with complete shield isolation, head-to-disk contact may cause a short to occur. These factors are often beyond the control of the head manufacturer and the end user. As a practical matter, it is difficult or impossible to ensure that the MR head shields are completely isolated. Therefore, efforts to improve the shielding of the head may prove futile. Efforts should instead be directed to improved signal processing methods which have the potential for substantially reducing readback signal noise.

One prior art technique for reducing noise in the readback signal is the use of a sampling process in conjunction with a digital filter. A block diagram of such a system is shown in FIG. 1. The analog readback signal received by transducer 39 is amplified by amplifier 101 and fed to the input of a high bandwidth analog lowpass filter 102 to remove high frequency noise from the readback signal. The lowpass-filtered signal is then passed on to an automatic gain control (AGC) 103 circuit which output is connected to an analog-to-digital converter (ADC) 104. The ADC 104 samples the incoming signal at periodic intervals spaced apart in time by To. The digital signal samples are fed to a partial response digital filter (PRDF) 106. The PRDF 106 serves as an equalizer and has a frequency response providing a relatively high gain over a range of mid-band frequencies, with tapered lower gain at both frequency extremes. The PRDF 106 may be, for example, a response class IV finite impulse response (FIR) filter. The digitally equalized filter output 119 is then ready to be decoded by decoder 108. Decoder 108 could be, for example, a Viterbi decoder cascaded with a run length limited (RLL) decoder. Decoder 108 also provides digital output synchronization lines 141 and 142 that are digital to analog converted by DACs 109 and 110, respectively. The decoder 108 recovers the data from the readback signal and sends it to the host computer on line 140.

The synchronization of AGC 103, ADC 104, PRDF 106, and digital decoder 108 is performed by a voltage-controlled oscillator (VCO) 113. The VCO 113 operates under feedback control from the analog output line 143 of DAC 109. The DAC 109 derives the feedback signal from the digital decoder 108 over the digital output synchronization line 141. The VCO output 120 provides a timing signal that is synchronized and locked to the readback signal. The VCO 113 uses the disk drive system crystal reference oscillator (OSC) 112 for bootstrapping and frequency reference purposes. The AGC 103 is controlled by a feedback signal from the digital decoder 108 over analog line 144.

The frequency of the VCO 113 determines the interval at which samples of the readback signal are to be taken. The VCO 113 provides the analog-to-digital converter 104 with a periodic waveform which controls the opening and closing of an electronic switch 117 within the ADC 104. The ADC 104 samples the signal passing through the electronic switch 117 and arriving at the input port 115 of the PRDF 106. Accordingly, the VCO 113 will adjust its frequency until signals at the desired sampling rate appear at the input port 115 of the PRDF 106. The output of the VCO 113 is also used to provide a synchronization signal for the digital decoder 108 at the decoder sync 121 input.

The system of FIG. 1 is subject to various design constraints. The theoretical minimum sampling rate for To is the bit rate or the Nyquist rate of the readback signal. However, when sampling the readback signal from the recording head 39, the sampling rate should be at least twice the highest expected data rate to avoid noise aliasing into the bandwidth of the recording channel. For example, if the highest data frequency is 10 MHz, and the sampling rate is 30 MHz, noise in the readback signal in the range of 18 to 22 MHz would alias down into the baseband from 8 to 12 MHz.

Noise aliasing significantly limits the performance of prior art disk drive systems employing a sampling process, such as the system shown in FIG. 1. Noise aliasing is of particular concern in state of the art disk drive systems, because a major design objective of these systems is to provide a data rate which is as high as possible. The wide data bandwidth of such disk drive systems increases the potential susceptibility of these systems to noise. Noise aliasing results in the transformation of high frequency noise down into the bandwidth of the data signal. This in-band noise is indistinguishable from the data readback signal, and is therefore impossible to remove.

The system configuration of FIG. 1 places the analog lowpass filter 102 and AGC 103 before the ADC 104 in the signal chain so as to reduce the noise aliasing problem. However, due to the proximity of the data frequencies to the noise frequencies, the lowpass filter 102 must have a relatively steep cutoff. Any phase nonlinearities in the filter will corrupt the readback signal.

Using state of the art analog filter design techniques, it is very difficult to design a practical, economically feasible lowpass filter 102 which has a frequency response providing a steep cutoff, while at the same time providing linear phase characteristics and reasonably low insertion loss. Bessel filter designs provide high insertion loss, but offer the advantages of comparatively sharp frequency cutoff characteristics and good linear phase response relative to other types of filter designs, such as the Chebychev, Butterworth, and Elliptic classes of filters. However, Bessel filters are very expensive to design and fabricate. A Bessel filter constructed to meet the requirements of the circuit shown in FIG. 1 would necessitate the use of many cascaded filter stages. A further disadvantage of Bessel filters is that they are overly sensitive to parameter variations at the input and output ports. The Bessel filter parameters will exhibit unacceptable variations from disk drive to disk drive. Even if the filters are optimized for use with a specific disk drive, the parameters also exhibit unacceptable variations across temperature. Accordingly, Bessel filters are not well suited for application as anti-aliasing lowpass filters in disk drive systems using read/write heads.

At present, there are no suitable alternative filter designs which would overcome the shortcomings of the Bessel filter configuration. The major disadvantage of the remaining filter design configurations relates to nonlinear phase response versus frequency. The nonlinear phase characteristics of alternative steep-cutoff lowpass filter designs cause phase distortions, such as zero-crossing distortion, in the higher frequencies of the readback signal. This type of distortion is often referred to as timing or crossover distortion, and it causes data errors in the detection process.

Design tradeoffs are inherent in Elliptic filter (sharp frequency cutoff) and Bessel filter (linear phase response) designs. Sharp frequency cutoff and linear phase response are mutually exclusive in simple analog filters. This design tradeoff can only be overcome through the utilization of relatively complex cascaded analog filters which are not cost-effective.

As with the lowpass filter 102, the PRDF 106 should also be designed to provide a minimum of phase distortion. However, unlike the situation with analog filters, it is a relatively straightforward matter to design a suitable PRDF 106 having linear phase response. The design of a suitable PRDF 106 for use in the configuration of FIG. 1 is well known to those skilled in the art.

The conventional sampling apparatus of FIG. 1 presents an additional shortcoming. The current trend is towards high bandwidth data channels, which increases the sampling rate required to reduce noise. However, under current state of the art technology, the maximum sampling rate is limited by the cutoff frequencies of existing solid-state devices. For high bandwidth channels, it would not be cost-effective to provide the high-frequency circuitry necessary to implement relatively high sampling rates.

FIG. 2 is a waveform showing the readback signal from an MR head using existing state of the art technology as illustrated in FIG. 1. The signal represents a CORSAIR file and has a baseband frequency of 2 MHz. The sampling rate is 20 nanoseconds, and no oversampling filtering technique is used. Of particular importance is the magnitude of the high frequency noise superimposed upon the readback signal. The noise amplitude is almost equal to the signal amplitude.

The waveform of FIG. 2 provides an illustrative example of magnetic domain noise superimposed on a data signal. This noise is especially visible in the range of 1.25 to 1.5 microseconds, as a damped high-frequency oscillation riding upon the 2 MHz data signal. Magnetic domain noise is caused by random variations in the magnetic domains of the disk occuring across an area traversed by the MR head. The noise exhibits nonlinear characteristics. In order to improve overall system performance, this noise should be reduced or eliminated from the data signal.

Accordingly, there is a manifest need for an improved noise minimization technique for data storage drives. Preferably, such a technique should not require the use of relatively high sampling frequencies, which is an especially important consideration in the context of high bandwidth channels. The technique should minimize or eliminate the problem of high frequency noise aliasing. Phase-linear filters should be employed to provide an accurate rendering of the data signal.

SUMMARY OF THE INVENTION

The invention provides an improved technique for minimizing the effects of noise sources in the environment of a data storage drive through the use of an oversampling process. The main objective of this invention is to minimize phase distortion in the data readback signal. Another objective is to minimize noise aliasing caused by having an analog bandpass filter with a frequency cutoff slightly below the Nyquist rate. A still further objective is to overcome the design tradeoffs inherent in Elliptic filter (sharp frequency cutoff) and Bessel filter (linear phase response) designs. Sharp frequency cutoff and linear phase response are mutually exclusive in simple analog filters.

The technique of the present invention operates in the environment of a data storage drive, such as a disk drive and/or a magnetic tape data storage system. For example, a preferred embodiment of the invention is utilized in conjunction with a disk recording system including a rigid magnetic disk, a mechanism for rotating the disk, a slider, a transducing device mounted to the slider, and a mechanism for maintaining the slider in a transducing relationship with respect to the rigid magnetic disk. The transducer transduces information from the disk when the disk is engaged in motion, thus receiving an analog readback signal from the disk. Although the invention is described in the environment of a disk drive, the invention may also be advantageously employed in the context of data storage drives which use magnetic tape.

According to a preferred embodiment of the invention, an improved method for extracting a low noise representation of digital data from the readback signal is provided. A first sequence of signals is produced from the readback signal by sampling the readback signal at a first sampling rate. This sequence of signals is filtered by a bandpass filter having substantially linear phase versus frequency characteristics, such that the phase characteristics of the sequence of signals are substantially preserved. A second sequence of signals is produced by sampling the first sequence of signals at a second sampling rate which is slower than the first sampling rate. The digital data are then extracted from the second sequence of signals by means of a digital decoding process.

BRIEF DESCRIPTION OF THE DRAWINGS

The various features, aspects, and advantages of the present invention will become apparent from the following more particular description thereof, presented in conjunction with the following drawing, wherein.

DETAILED DESCRIPTION OF THE PREFERRED EMBODIMENTS

Figure 3:
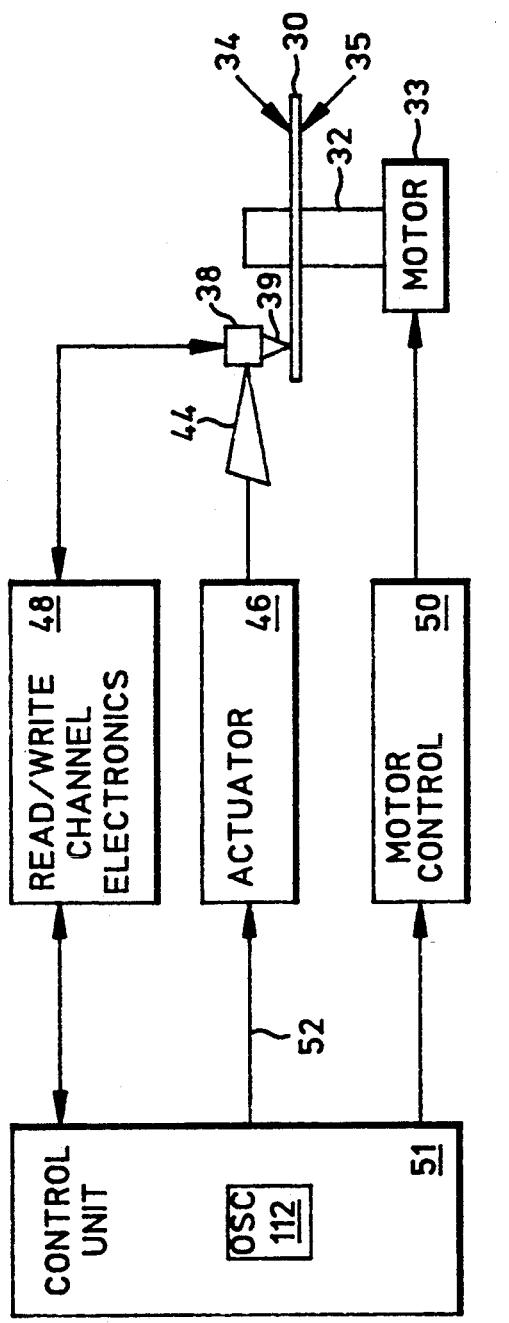
FIG. 3 is a perspective view and partial block diagram illustrating means for employing the invention in an industrial environment.

FIG. 3 is a perspective view and partial block diagram illustrating means for employing the present invention in the context of a disk drive. A rigid magnetic disk 30 is mounted on a rotatable spindle 32 that is rotated by a drive motor 33. The disk 30 has an upper surface 34 and a lower surface 35. A slider 38 with a transducer 39 mounted thereon faces the upper surface 34. The slider 38 is positioned with respect to the surface 34 by a moveable slider arm assembly 44. The arm assembly is conventionally mounted to an actuator 46. The transducer 39 is connected to conventional read/write channel electronics 48.

A disk drive control unit 51, typically in the form of a processor, provides position control signals on a signal path 52 to the actuator 46. These signals control the position of the slider 38 with respect to the surface of the disk 30. The motor control unit 50 provides motor speed control to control the rotational speed of the drive motor 33. The disk drive control unit 51 also processes read and write signals for the transducer 39 on the slider 38 by way of the read/write channel electronics 48. The operations of the read/write channel electronics 48, the actuator 46, and the motor control unit 50 are coordinated by means of the disk drive control unit 51. The disk drive control unit 51 may be implemented using a microprocessor operating in conjunction with a crystal reference oscillator (OSC) 112.

Figure 1:
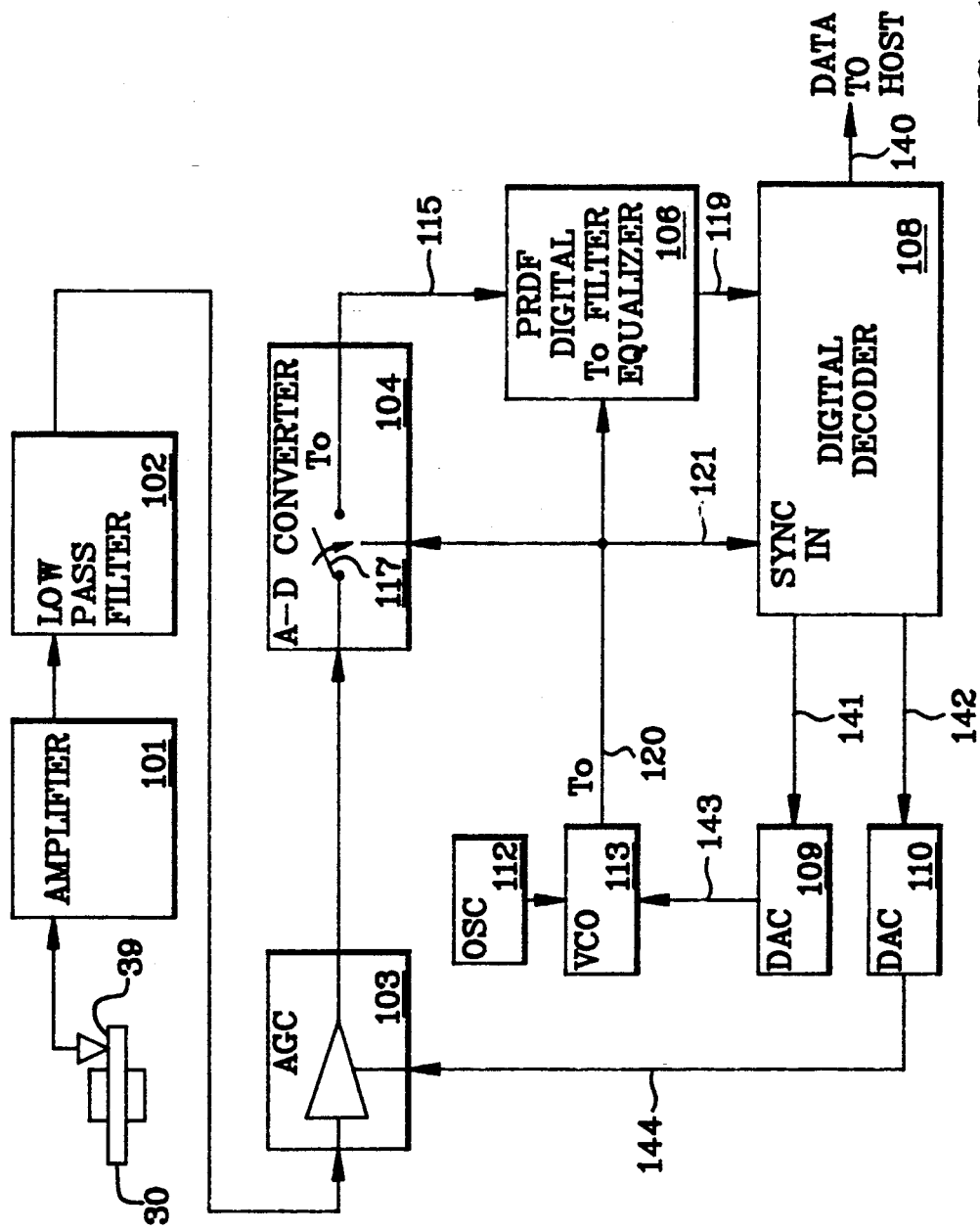
FIG. 1 is a block diagram illustrating a prior art system for processing a readback signal from a disk drive recording head.
Figure 4:
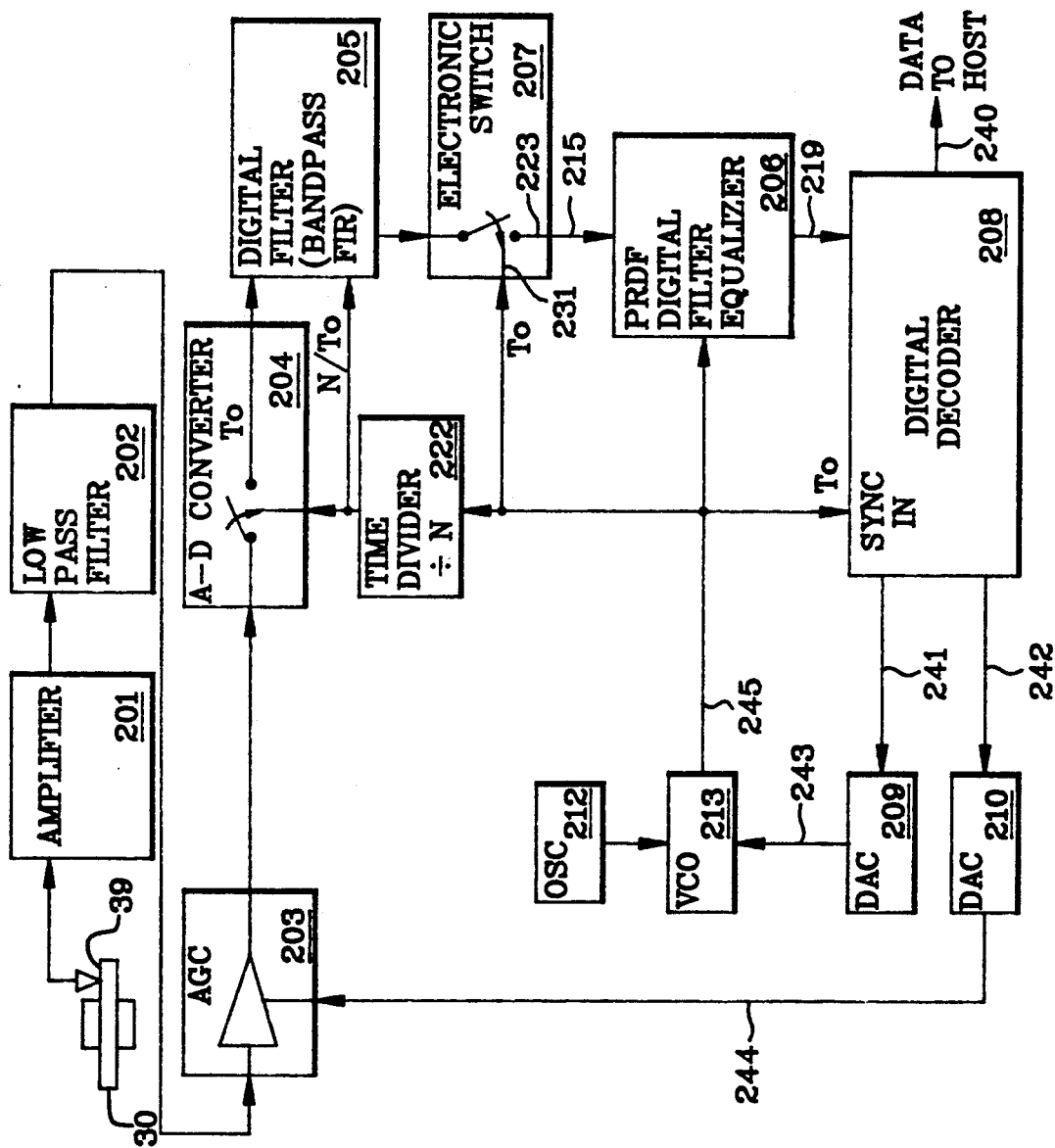
FIG. 4 is a block diagram illustrating the essential complement of functions for operation of the invention in the industrial environment of FIG. 3.

FIG. 4 is a block diagram illustrating the essential complement of functions for operation of the invention in the industrial environment of FIG. 3. The configuration of FIG. 4 is an improved recording head noise minimization system which overcomes many of the shortcomings inherent in the prior art design of FIG. 1. The major problem with the design of FIG. 1 is the phase distortion caused by the passage of high frequency components through the analog bandpass filter 102 which are relatively close to the filter cutoff frequency. These frequency components occur near the Nyquist rate of $1/(2 T_o)$. This distortion causes timing shifts in the transitions of the high frequency components of the readback signal. In turn, the timing shifts cause the decoder 108 to produce data errors.

The main objective of this invention is to minimize phase distortion in the data readback signal. Another objective is to minimize noise aliasing caused by having an analog bandpass filter with a frequency cutoff slightly below the Nyquist rate. A still further objective is to overcome the design tradeoffs inherent in Elliptic filter (sharp frequency cutoff) and Bessel filter (linear phase response) designs. Sharp frequency cutoff and linear phase response are mutually exclusive in simple analog filters. This design tradeoff can only be overcome through the utilization of relatively complex cascaded analog filters which are not cost-effective.

In order to solve these problems, the system of FIG. 4 employs the technique of oversampling. The principle of oversampling is to sample the analog readback signal from the MR head at an integer multiple rate of the data rate. The oversampling rate is represented by the mathematical expression $N/T_o$, where N is an integer and $T_o/N$ is the time period between two consecutive samples. The oversampling technique of the present invention is also operable where N is a positive non-integer. However, there is no inherent benefit in using non-integer values. Integer values are preferred so as to simplify the circuit design.

With reference to FIG. 4, the noise minimization technique of the present invention, as applied to the magnetic recording data readback process, operates as follows. The readback signal received by the transducer 39 is amplified by amplifier 201, lowpass filtered by analog lowpass filter (LPF) 202, and passed through an automatic gain control (AGC) 203 circuit. The output of AGC 203 is fed to the input of an analog-to-digital converter (ADC) 204 having a sampling rate of $N/T_o$. In contrast to the system of FIG. 1, this is N times faster than the sampling rate provided by prior art systems.

The LPF 202 is a typical Bessel filter with a cutoff frequency N times that of the LPF 102 in the system of FIG. 1. Depending upon the noise bandwidth of the data readback process, it may be possible to eliminate the LPF 202. The LPF 202 is primarily used as an antialiasing filter with a cutoff slightly below the Nyquist rate of $N/(2 T_o)$. As will be explained more thoroughly hereinafter, the use of a bandpass digital filter 205 obviates the need for a conventional analog lowpass filter.

The analog-to-digital converter 204 samples the incoming signal at periodic intervals spaced apart in time by $T_o/N$, corresponding to a sampling rate (frequency) of $N/T_o$. Therefore, the analog-to-digital converter 204 must be equipped to operate at a higher frequency than the analog-to-digital converter 104 shown in FIG. 1. The speed at which the analog-to-digital converter 204 must operate will be determined by the circuit designer's choice of an integer value for N. Existing state of the art analog-to-digital converter 204 designs permit sampling at frequencies in excess of 50 MHz.

The sampled signals are fed to a bandpass digital filter 205, which in a preferred embodiment of the invention is a finite impulse response (FIR) digital filter. The function of the bandpass digital filter 205 is to remove noise from the sampled readback signal. An important feature of the digital filter 205 is that it is designed to have linear phase response for all input frequencies. As a consequence of the linear phase response, the output of filter 205 exhibits no crossover distortion or jitter.

Although one could employ an analog lowpass filter as shown in FIG. 1 for the purpose of removing noise from the readback signal, the use of bandpass digital filter 205 is preferred. The only analog filter design that approaches the ideal design characteristic of perfect linear phase response is a Bessel filter. A Bessel filter designed for use in the configuration of FIG. 1 would employ numerous cascaded stages, and would be quite costly to fabricate. Manufacturing variations in the components connected to the Bessel filter inputs and outputs would cause the frequency response of the filter to deviate unacceptably from the required design parameters. Even if the values of the filter components were adjusted at the factory, filter alignment would drift unacceptably over temperature. Such filter alignment would be a tedious, expensive procedure, especially because of the number of filter stages required, and the tuning interaction amongst the various stages.

Many of the aforementioned problems are inherent in conventional analog filter designs. Fortunately, a viable, cost-effective solution to these problems is to employ a digital bandpass filter design in the circuit of FIG. 4. Digital filters exhibit virtually perfect linear phase response over the entire range of input frequencies. Temperature drift is not a problem. Furthermore, digital filter designs are insensitive to manufacturing variations in the circuit components connected to the filter. No elaborate filter alignment procedures are required. In the preferred embodiment of the present invention, the digital filter 205 would have an upper cutoff frequency slightly below $1/(2 T_o)$.

The output of the digital filter 205 is fed to an electronic switch 207. The electronic switch 207 implements a second signal sampling process. The trigger input 231 of the electronic switch 207 is activated as required, such that the switch passes one out of every N samples to the switch output 223. The sampling rate of the electronic switch is equal to $1/T_o$, because samples are taken at periodic intervals of To. The sampled signal at the switch output 223 is fed to a partial response digital filter (PRDF) 206. The PRDF 206 has a frequency response providing a relatively high gain over a range of mid-band frequencies, with lower gain at both frequency extremes. The PRDF 206 may be, for example, a partial response class IV filter. The digitally filtered output is then ready to be digitally decoded by decoder 208. Accepting an input at signal input 219, the decoder 208 recovers the data from the readback signal.

Decoder 208 could be, for example, a Viterbi decoder cascaded with a run length limited (RLL) decoder. Decoder 108 also provides digital output synchronization lines 241 and 242. The digital signals on output synchronization lines 241, 242 are converted into analog signals by digital to analog converters (DACs) 209 and 210, respectively. The decoder 208 recovers the data from the readback signal and sends the data to the host computer on line 240.

The synchronization of AGC 203, ADC 204, bandpass filter 205, electronic switch 207, PRDF 206, and digital decoder 208 is performed by a voltage-controlled oscillator (VCO) 213 operating in conjunction with the digital decoder 208. Various methods may be employed to achieve synchronization. For example, the VCO may be placed under feedback control from analog line 243, and the AGC may be placed under feedback control from analog line 244. The VCO output line 245 synchronizes digital decoder 208, electronic switch 207, and PRDF 206. The VCO output line 245 is also fed to the input of a time divider 222 which provides an output in the form of timing markers spaced apart by $T_o/N$. Output line 246 is used to synchronize both the ADC 204 and the digital filter 205. The VCO 213 employs a master oscillator 212 located in the disk drive control unit 51 (FIG. 3) for bootstrapping purposes during start-up.

The output of the VCO 213 is used as a source for the trigger signal applied to the trigger input 231 of the electronic switch 207. Note that the electronic switch 207 must pass only one out of every N samples of the incoming signal, corresponding to a frequency of $1/T_o$. Accordingly, the output of the VCO 213 is connected to a time divider circuit 222 which divides the VCO 213 signal by N. The divided VCO signal is then applied to the trigger input 231 of the switch 207.

The digital decoder 208 utilizes the output of the VCO 213 as a source for a synchronization signal. The synchronization signal is applied to the SYNC 221 input of the digital decoder. In a preferred embodiment of the invention, the digital decoder consists of two stages. The first decoder stage is a three-state decoder responsive to three logic states, which may be denoted by $-1$, 0, and $+1$. A suitable tri-state decoder for use in the digital decoder 208 block is a decoder design commonly known to those skilled in the art as a Viterbi decoder.

The second stage of the decoder 208 is a run length decoder. Examples of run length decoders are decoders equipped to operate using the 8/9 code, the (2,7) code, and other various types of run length codes. Each run length code provides a unique frequency power spectrum, where some frequencies are more heavily utilized than others. The selection of a specific code may be governed by the frequency power spectrum presented by particular codes. A frequency power spectrum can be selected to center the power spectrum within the response curve peak of a filter or equalizer. In this manner, the selection of the appropriate code will improve the overall signal to noise ratio of the disk drive system.

The components of the recording head noise minimization system illustrated in FIG. 4 may be implemented using two modules. A first module contains all high-frequency circuits, such as the analog-to-digital converter 204, and the bandpass digital filter 205. The low-frequency components are contained within a second module. In this manner, improved shielding measures may be incorporated into the design of the first module in a cost-effective manner. Such shielding is desirable to minimize the effects of stray electromagnetic fields on the high-frequency portions of the circuitry. If these stray fields are of sufficient magnitude, they may appear as noise on the signal waveform. Shielding is also desirable to minimize undesirable interaction between the noise minimization system and other electronic equipment.

The linear phase characteristics of the system shown in FIG. 4 eliminates or substantially minimizes the need for write compensation coding techniques. Write compensation coding operates by slightly changing the timing of a data write operation, writing either earlier or later, depending upon the frequency spectrum of the data. For example, high frequency data may be written early, whereas low frequency data may be written late. In prior art systems using write compensation schemes, it is often necessary to compensate for the nonlinear phase characteristics of the system filters, in order to ensure that the readback signal is recovered properly. However, in the system of the present invention, write compensation coding could be employed without the use of phase compensation techniques, or the use of write compensation could be eliminated altogether.

Figure 2:
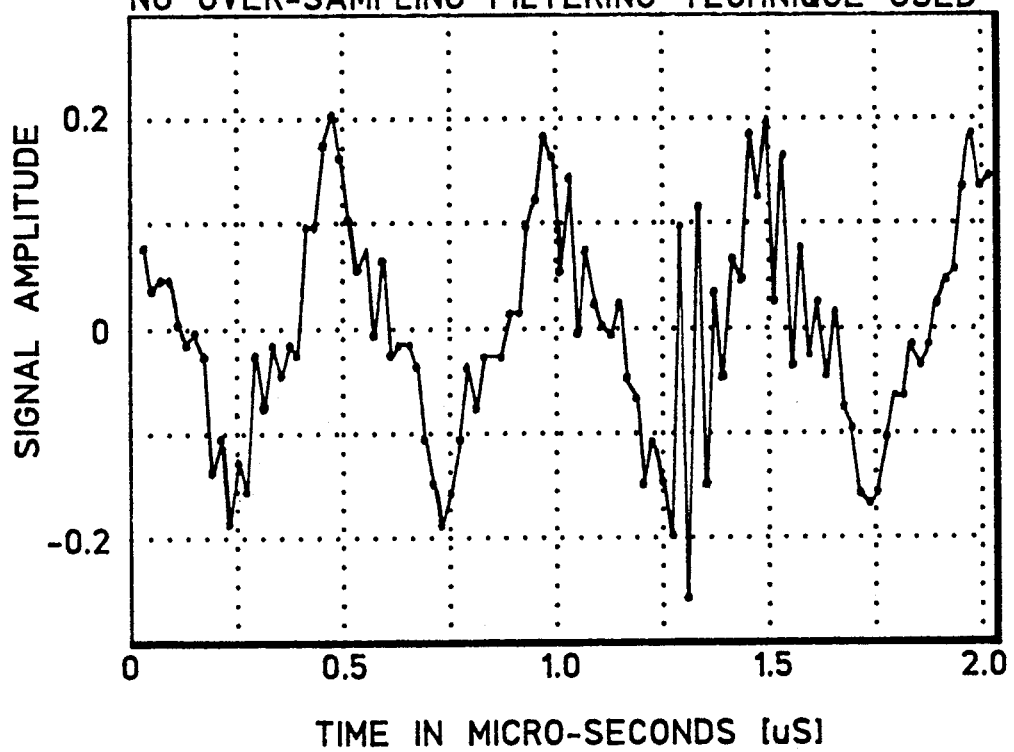
FIG. 2 is a graph showing readback signal amplitude versus time for a disk drive recording head of the prior art.
Figure 5:
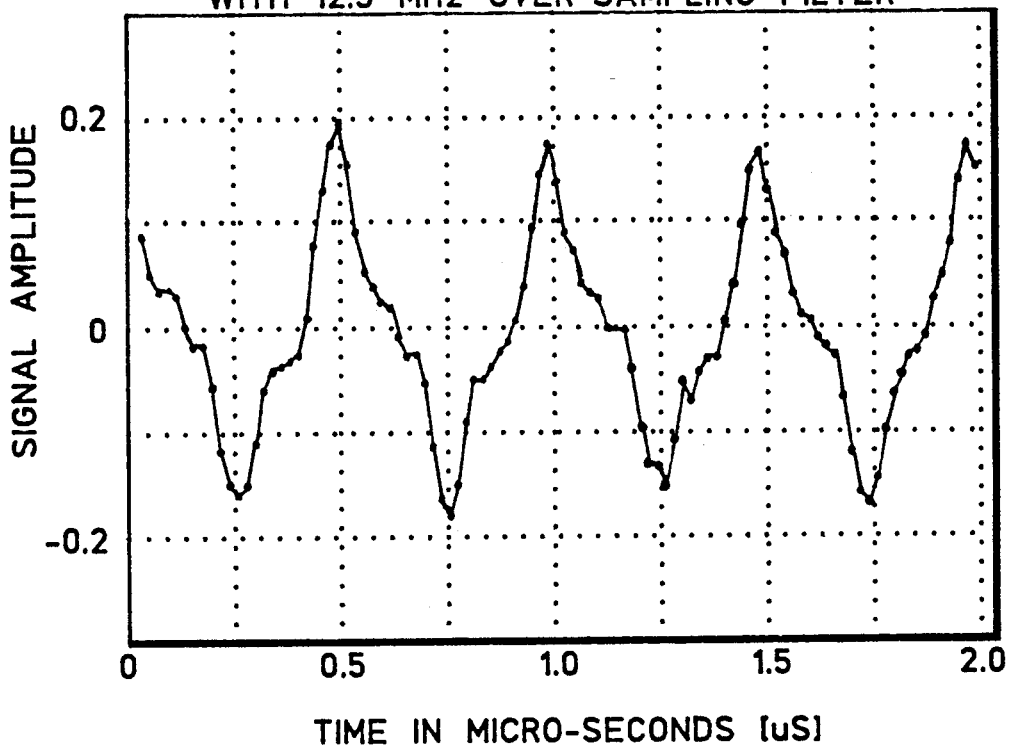
FIG. 5 is a graph showing readback signal amplitude versus time for the recording head noise minimization technique of the present invention.

FIG. 5 is a waveform showing the readback signal from an MR head using the improved recording head noise minimization system shown in FIG. 4. As compared to the waveform of FIG. 2, the waveform of FIG. 5 contains significantly less noise. The graphs of FIGS. 2 and 5 were both prepared by reading identical signals from the magnetic disk 30 (FIGS. 1 and 4). The signals of FIGS. 2 and 5 both have a baseband frequency of 2 MHz, and they both represent identical data sets from a CORSAIR file. For the graph of FIG. 2, the sampling rate is 20 nanoseconds, corresponding to a frequency of 50 MHz. The noise superimposed on the signal of FIG. 2 is clearly evident.

The graph of FIG. 5 illustrates the effects of oversampling and digital filtering on the readback signal recovered from the MR head. The signal was sampled by the analog-to-digital converter 204 at first sampling rate N/To corresponding to a frequency of 50 MHz. The sampled signal was processed by digital bandpass filter 205. Every other sample of the filter output was then fed to the PRDF 206, thereby implementing a value of 2 for N. Accordingly, the effective sampling rate for the graph of FIG. 5 is only 40 nanoseconds, corresponding to a frequency of 25 MHz, as contrasted to the 50 MHz sampling frequency of FIG. 2. Nevertheless, the graph of FIG. 5 indicates a marked reduction in noise as compared with FIG. 2.

Figure 6:
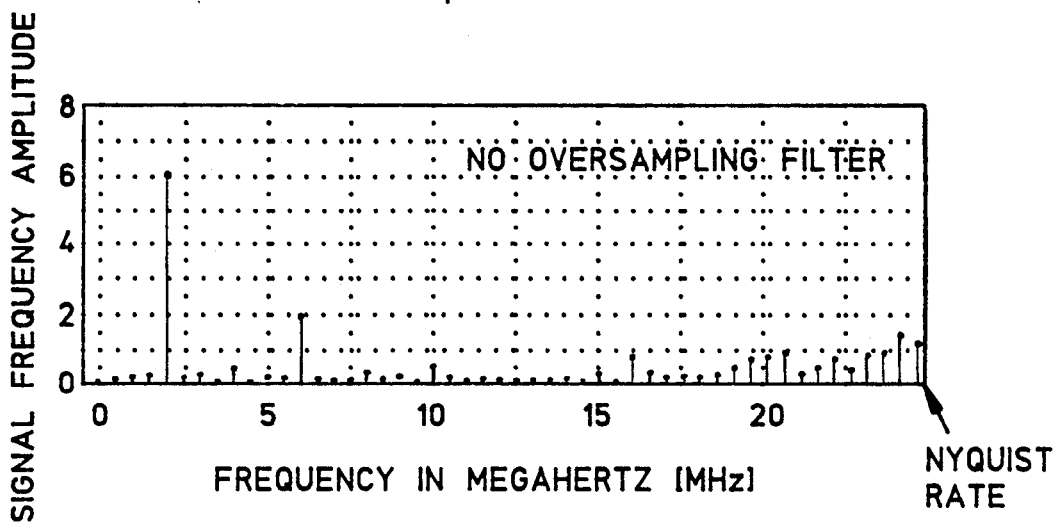
FIG. 6 is a graph comparing the readback signal frequency spectrum for the prior-art readback signal processing system of FIG. 1 to the frequency spectrum for the recording head noise minimization technique of the present invention illustrated in FIG. 4.
Figure 6:
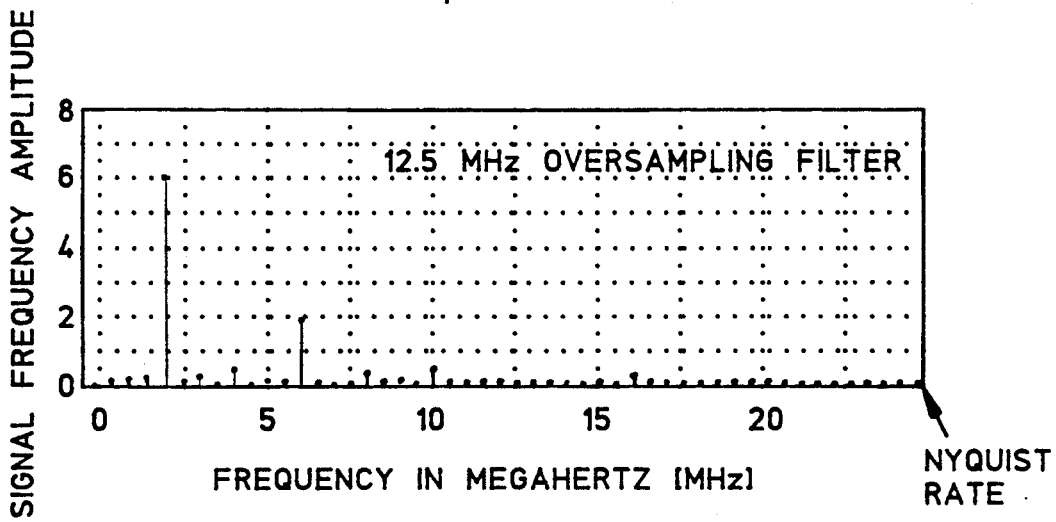

FIG. 6 is a graph comparing the readback signal frequency spectrum for the prior-art readback signal processing system of FIG. 1 to the frequency spectrum for the recording head noise minimization technique of the present invention illustrated in FIG. 4. The upper graph represents the frequency spectrum for the case where no oversampling filter is used, whereas the lower graph shows the effects of a 12.5 MHz oversampling filter on the frequency spectrum. For each of the graphs, the tall spike at 2 MHz represents the data signal. All other spikes represent undesired noise or harmonics of the data signal.

With reference to the upper graph, note the relatively high level of energy distribution in the range of 15 to 25 MHz. This distribution represents high frequency noise components in the data signal. Referring now to the lower graph, the level of these high frequency components has been significantly reduced. The graphs of FIG. 6 demonstrate the effectiveness of the technique of the present invention in eliminating high frequency noise from the data signal.

A number of specific embodiments of the present invention have been described. Nevertheless, it will be understood that various modifications and changes may be made without departing from the spirit and scope of the invention. For example, although a preferred embodiment of the invention was described in conjunction with disk drives, the invention is also applicable to data storage drives which use magnetic tape. The invention may be used with both hard and soft (floppy) disk drives. Accordingly, it is to be understood that the invention is not to be limited by the specific illustrated embodiments, but only by the scope of the appended claims.

We claim:

1. In a disk recording system including a rigid magnetic disk, means for rotating the disk, a slider, a transducer mounted on the slider for creating an analog readback signal representing digital data from the disk, and means for maintaining the slider in a transducing relationship with the disk to enable the transducer to transduce the digital data in response to rotation of the disk, a method for extracting an anti-aliased low-noise representation of the digital data from the analog readback signal, the method comprising the ordered steps of:

(a) producing a first sequence of signals from the analog readback signal by periodically sampling the analog readback signal at a first sampling rate $N/T_0$, such that the time period $T_0/N$ represents the time interval between two temporally consecutive periodic samples, where N is a positive number greater than unity;

(b) bandpass filtering the first sequence of signals such that the phase characteristics of the first sequence of signals are preserved in a filtered first sequence of signals;

(c) producing a second sequence of signals by sampling the filtered first sequence of signals at a second sampling rate $1/T_0$; and (d) reconstructing the anti-aliased low-noise representation of the digital data from the second sequence of signals by processing each signal in the second sequence of signals in a time period substantially equal to $T_0$.

2. In a disk recording system including a rigid magnetic disk, means for rotating the rigid magnetic disk, a slider, a transducer mounted on the slider for creating an analog readback signal representing digital data from the disk, and means for maintaining the slider in a transducing relationship with the rigid magnetic disk to enable the transducer to transduce the digital data in response to rotation of the disk, a combination for extracting an anti-aliased low-noise representation of the digital data from the analog readback signal, the combination comprising:

(a) conversion means coupled to the transducer for producing a first sequence of signals from the analog readback signal by periodically sampling the analog readback signal at a first sampling rate $N/T_0$, such that the time period $T_0/N$ represents the time interval between two temporally consecutive periodic samples, where N is a positive number greater than unity;

(b) bandpass filtering means coupled to the conversion means for bandpass filtering the first sequence of signals such that the phase characteristics of the first sequence of signals are preserved in a filtered first sequence of signals;

(c) sampling means coupled to the bandpass filtering means for producing a second sequence of signals by sampling the filtered first sequence of signals at a second sampling rate $1/T_0$; and (d) digital decoding means coupled to the sampling means for reconstructing the anti-aliased low-noise representation of the digital data from the second sequence of signals by processing each signal in the second sequence of signals in a time period substantially equal to $T_0$.

3. A combination for extracting a low-noise representation of digital data as set forth in claim 2 wherein the conversion means is an analog-to-digital converter having a sampling rate in the range of 10 to 100 MHz.

4. A combination for extracting a low-noise representation of digital data as set forth in claim 2 wherein the bandpass filter means is a digital finite impulse response filter.

5. A combination for extracting a low-noise representation of digital data as set forth in claim 2, the digital decoding means further including a first decoder coupled to said sampling means and responsive to a first logic state of −1, a second logic state of 0, and a third logic state of +1.

6. A combination for extracting a low-noise representation of digital data as set forth in claim 2, the digital data having at least one run length, the digital decoding means further including:
a first decoder coupled to said sampling means and responsive to a first logic state of −1, a second logic state of 0, and a third logic state of +1; and
a second decoder coupled to said first decoder and responsive to the run length of said digital data to decode said digital data.

7. A rigid magnetic disk recording system including:
a rigid magnetic disk with a recording surface;
means for rotating the disk;
a slider;
a transducer mounted on the slider for creating an analog readback signal representing digital data from the disk, wherein the analog readback signal has a bandwidth;
means for maintaining the slider in a transducing relationship with the recording surface in response to rotation of the disk;
first sampling means coupled to the transducer for producing a first sequence of signals from the analog signal by periodically sampling the analog readback signal at a first sampling rate $N/T_0$, such that the first time period $T_0/N$ is the time duration between any two temporally adjacent signals, wherein $N > 1$;
filter means coupled to the first sampling means for bandpass filtering the first sequence of signals such that the phase characteristics of the first sequence of signals are preserved in a filtered first sequence of signals;
second sampling means coupled to the filter means for producing a second sequence of signals by sampling the filtered first sequence of signals at a second sampling rate $1/T_0$; and
digital decoding means coupled to the sampling means for producing an anti-aliased low-noise representation of the digital data in response to the second sequence of signals by processing each signal in the second sequence of signals in a time period substantially equal to $T_0$.

* * * * *